REMOTE READER SYSTEM

Filed Aug. 23, 1960 2 Sheets-Sheet 1

| | 12 | 11 | 0 | 1 | 2 | 3 | 4 | 5 | 6 | 7 | 8 | 9 |
|---|---|---|---|---|---|---|---|---|---|---|---|---|
| F | 465 | 555 | 645 | 735 | 825 | 915 | 1005 | 1095 | 1185 | 1275 | 1365 | 1455 |
| f | 930 | 1110 | 1290 | 1470 | 1650 | 1830 | 2010 | 2190 | 2370 | 2550 | 2730 | 2910 |
| | 1 | 2 | 3 | 4 | 5 | 6 | 7 | 8 | 9 | | | |
| Cf | 1500 | 1600 | 1700 | 1800 | 1900 | 2100 | 2500 | 2600 | 2800 | | | |

INVENTOR
JOHN R. KNIGHT
BY Carl C. Kling
ATTORNEY

April 3, 1962 J. R. KNIGHT 3,028,081

REMOTE READER SYSTEM

Filed Aug. 23, 1960 2 Sheets-Sheet 2

United States Patent Office 3,028,081
Patented Apr. 3, 1962

3,028,081

REMOTE READER SYSTEM

John R. Knight, Poughkeepsie, N.Y., assignor to International Business Machines Corporation, New York, N.Y., a corporation of New York Filed Aug. 23, 1960, Ser. No. 51,322
3 Claims. (Cl. 235—61.11)

This invention relates to remote-input data processing systems, and more particularly to a system for operating a plurality of card readers in conjunction with a central processor.

Certain computing applications such as airline reservations systems require up-to-the-minute computation of information which may originate at any of a large number of outlying stations. Such a central computation system, to be feasible, requires a reasonable speed, low priced document reader at the information source which is compatible with the central processor and which can transmit information from its original document to the computer over standard telephone communication lines. Because there may be several hundred document readers in the system, the readers themselves must be low in cost or the system becomes too expensive to be used. Each reader must be fully compatible with a central computer without the necessity of frequent tuning or aligning operations and must not demand frequent repairs from service engineers who may be located at great distances from certain of the reader locations.

It is the primary object of the invention therefore to provide for such a system, a card reader which is inexpensive in original cost, reasonably trouble free, and which automatically maintains tuning alignment with the central computer.

Another object of the invention is to provide a card reader for altering signals originated by a central computer according to information contained in the card being read and for returning the modulated signals to the central computer.

A more specific object of the invention is to provide a system for two-way transmission over a single communication line, in which a central computer transmits to a card reader a composite signal which is altered according to data on a card and returned to the central computer on the same communication line.

The invention comprises a system wherein a frequency signal generator associated with the central computer produces a number of elemental frequencies equal to the number of parallel bits to be read in the card at one time and supplies these frequencies to each of a number of card readers at remote stations. In each card reader the elemental frequencies are amplified and applied to a number of individual bit scanning kits equal to the number of bits in a reading group. Each bit scanning kit includes a filter-light set and a photoconductor and operates to scan a related bit position. The filter-light set resonates at the elemental frequency assigned to the bit position and applies this elemental frequency to a light beam associated with the particular bit, thus producing a distinctively modulated reading frequency light beam at double the elemental frequency. The light beam is applied through the hole in the card to the photoconductor. For reading the twelve bits of the standard IBM code in parallel, there are twelve elemental frequencies, and twelve bit scanning kits each including an elemental frequency filter-light set, producing light modulated according to its reading frequency, and a photoconductor area. All photoconductor areas connect to a line driver which produces signals representing a composite of the reading frequencies associated with the bits punched in the document, suitably matched to the communication line for transmittal as data back to the central computer.

Control functions of the card readers are accomplished by control signals sent out on a control channel from the central computer.

A distinctive feature of the invention is the filter-light set in the bit scanning kit which produces ligh modulated according to a characteristic bit reading frequency, a multiple of the frequency of an elemental frequency signal originated by the central computer, for transmission of data to the computer over a common communication line with the elemental frequencies and control frequencies.

Another feature is a filter-light set in which a filter resonates at an elemental frequency and applies the resonant frequency signal to a lamp filament, which, reaching maximum incandescence on each half cycle, produces a light beam modulated at a reading frequency double the elemental frequency.

Another feature is a filter-light set in which a resonant reed relay vibrates according to the elemental frequency, moving a mask into and out of the path of a continuous light beam for the bit, to modulate the light beam according to the pattern of the mask and the vibrating frequency.

The foregoing and other objects, features and advantages of the invention will be apparent from the following more particular description of a preferred embodiment of the invention, as illustrated in the accompanying drawings.

Figures 1, 2, 3, 4:
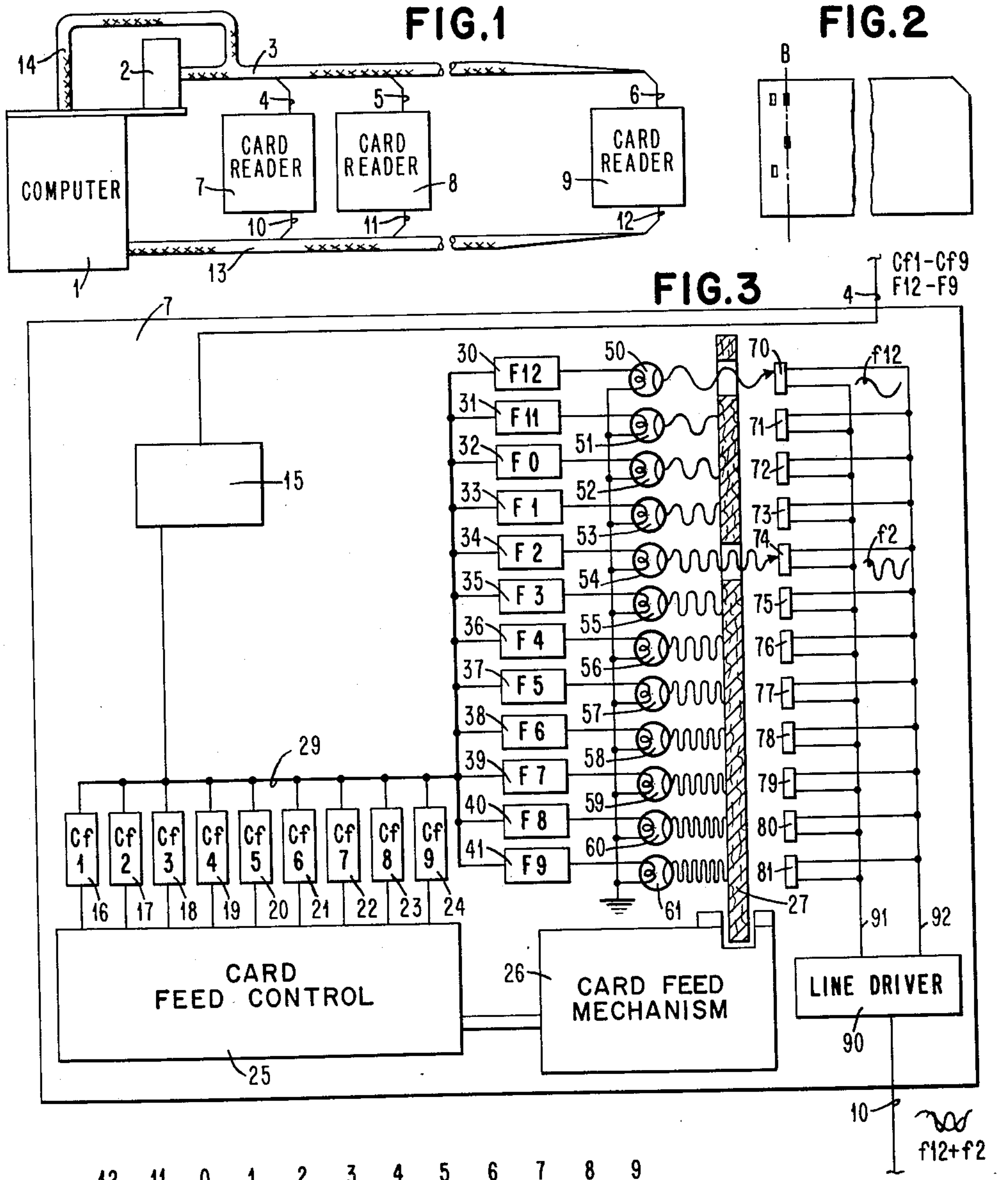
FIG. 1 is a block diagram of a remote reader data processing system embodying the invention.
FIG. 2 is a view of a punched record card.
FIG. 3 is a diagrammatic presentation of the invention.
FIG. 4 is a chart of frequencies used in carrying out the preferred embodiment.

FIG. 1 illustrates a block diagram of the system. Central computer 1, with its associated signal generator 2, is located in the central office. Signal generator 2 produces, for the twelve bit parallel code shown in the embodiment, a composite signal including twelve elemental frequencies which are applied via trunk 3 to communication lines 4, 5 and 6. Lines 4, 5 and 6 connect to card readers 7, 8 and 9 at their respective locations. The card readers produce data signals as distinctive variations of the control frequency controlled by the bit marks in the card being read. The composite of these data signals is applied by lines 10, 11 and 12 to the return trunk 13 for use by the central computer 1. The central computer generates control signals on the control trunk 14 which connects to card readers 7, 8 and 9 via trunk 3. The card readers feed, skip, release, or read according to control signals from the center computer. The central computer may interrogate each associated card reader in turn during each standard time interval, or may await a ready-to-read signal from the card reader. In any event only one card reader in the system is to be read during any single reading interval in the preferred embodiment.

FIG. 2 illustrates a record card punched in 12-bit parallel IBM code. The bits (punches) are designated 12, 11, 0, 1–9 in any column of the card. Combinations of punches represent various information; for example, the combination of the 12 punch and 2 punch indicates the letter B.

FIG. 3 illustrates schematically card reader 7 of FIG. 1. Control signals $Cf1$–$Cf9$ applied via line 4 are amplified by driver 15 and filtered through filters 16 to 24 to operate card feed control 25 when selected by computer 1. Card feed control 25 operates card feed mechanism 26 to move a record card 27 past a position for sensing a character, commonly 12 bits in parallel. Card 27 is shown with a column containing a "B" (12 punch and 2 punch) at the reading station. The card feed mechanism may step column-by-column or simply drive the card column-by-column past the reading station.

Elemental frequencies F12–F9 appear continuously on line 4 during reading, and in amplified form are continuously applied by driver 15 via bus 29 to bandpass filters 30—41. Each bandpass filter has its characteristic frequency which is the reading frequency associated with the related bit. A representative set of such reading frequencies, elemental frequencies and control frequencies appears in the chart FIG. 4. All frequencies fall within the 100–3000 cycles band at which normal communication lines function.

The output of each bandpass filter is coupled directly to an associated lamp 50—61 respectively, to form a filter-light set for reading the associated bit. The lamps produce maximum light outputs for each alternation of the associated filter output, at the reading frequency $f12$–$f9$ as indicated in the chart. The lamps are equipped with lenses or shielded so that their light outputs are directed toward related photoconductors 70—81. Each filter-light set and its optically coupled photoconductor forms a bit scanning kit for the related row of punches.

Where the bit value is 0 (no punch) the light output is blocked and the photoconductor remains dark. Where the bit value is 1 (punch) the light reaches the photoconductor. In the illustration, the 12 punch and 2 punch appear in the card column being read: light beams modulated at reading frequencies $f12$ and $f2$, generated by lamps 50 and 54 respectively, are applied to photoconductors 70 and 74 respectively. The composite of reading frequencies $f12$ and $f2$ for 1-valued bits (punched positions) 12 and 2 is applied to line driver 90 via conductor pair 91—92. The line driver amplifies the composite frequency and applies it to communication line 10 for transmittal back to the central computer, where means such as a set of twelve filters resonant respectively at $f12$–$f9$ separates the returning signals.

Elements 15, 25, 26 and 90 are shown merely as block diagrams. Driver amplifier 15 may be any of a variety of power amplifiers suitably matched for input from a communication line and having output power sufficient to overcome the impedances of the filters and output lamps. Card feed control 25 may be any of several types of control circuits for operating a selected remote unit under control of signal groups from a central unit. Card feed mechanism 26 may be an IBM type 024 card punch with the punch station modified to contain the photoconductors in place of the punch die and the lamps in place of the punches. Line driver 90 may be any of several amplifying devices with input matched to twelve photoconductors in parallel and output matched to the impedance of the communication line.

FIG. 1 shows each card reader operating on two communication lines. Where the communication line is a matched pair or other quality transmission medium which can transmit all frequencies in the chart shown in FIG. 4 without undue distortion, a single communication line suffices. Line driver 90 (FIG. 3) in card reader 7 (FIG. 1) is connected to line 4 rather than line 10, and the line drivers in other readers similarly connect to incoming lines.

Figure 5:
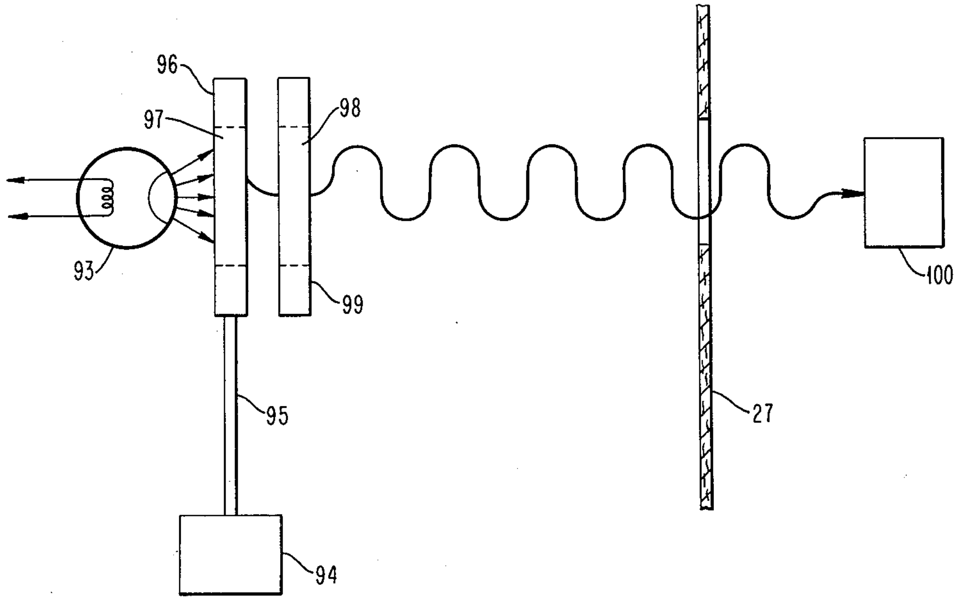
FIG. 5 is a diagram of a resonant reed filter-light set.
Figure 6:
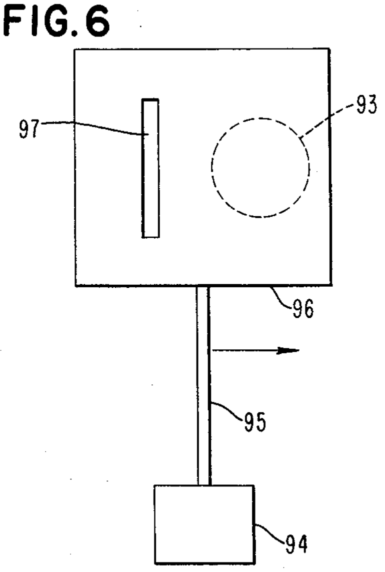
FIGS. 6 and 7 are diagrams of frequency multiple masks for the reed filter-light set.
Figure 7:
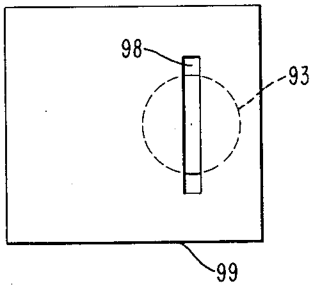

FIGS. 5–7 illustrate a second type of bit scanning kit utilizing a filter-light set formed of a direct current lamp 93 (or a single light source may be suitably masked and focussed to produce a full group of bit reading light beams, one beam for each set) and a resonant reed relay which vibrates a mask to modulate the reading beam. Commercially available reed relays have a coil 94 and a reed armature 95 which is dimensioned for mechanical resonance at a rated frequency. A resonant reed relay rated at F12 follows F12; its reed makes one excursion per cycle in the usual operation. To produce $f12$, a frequency multiple mask 96 is affixed to the free end of the reed. For frequency doubling, the mask is provided with a single transparent slot 97 (FIG. 6) and two opaque portions and positioned to traverse the reading light beam for the related bit on each vibration. Slot 97 of the mask lines up with slot 98 of stationary mask 99 twice on each cycle as it moves out and returns to a home position with one opaque portion blocking the beam. As F12 signals operate the reed relay, the light beam from lamp 93 to photoconductor 100 is modulated at $f12$; as slot 97 lines up with slot 98 and the 12 hole in card 27. Similar filter-light sets produce other reading frequency light beams at $f11$–$f9$.

Other frequency variations can be produced by varying the mask patterns of transparent and opaque sections used on the relay reed. Accordingly, in response to a single low frequency elemental frequency signal, a group of identical reed relays equipped with a group of varying frequency multiple masks produce a full group of reading frequency signals for reading a card.

While the invention has been shown and described with reference to a preferred embodiment thereof, it will be understood by those skilled in the art that the foregoing and other changes in form and details may be made therein without departing from the spirit and scope of the invention.

What is claimed is:

1. In a computing system having a central computer and a multiplicity of remote outposts at which documents are prepared for computer input via a multiplicity of document scanners, at least one at each outpost, the system having system scanning control means to control scanning of a document by a selected one of such multiplicity of document scanners: signal generator means for generating a composite signal including an elemental frequency signal, said composite signal to be delivered via communication lines to said document scanners; each document scanner comprising: a group of bit scanning kits equal to number to the bits in a reading group—each bit scanning kit including a filter-light set responsive to an elemental frequency signal from said signal generator, means for producing a reading light beam at a distinctive reading frequency and including a photoconductor element—associated with the respective bit, positioned facing the respectively related filter-light set in card reading fashion; feed mechanism responsive to the scanning control means for moving a document past said group of bit scanning kits to produce reading frequency signals according to the respective bit values; means connecting said bit scanning kit photoconductor elements in parallel to generate a composite data signal; and means to connect said composite data signal to a communication line for transmittal back to said central computer.

2. A system according to claim 1 wherein said bit scanning kit consists of: a photoconductor element; a filament lamp arranged to illuminate said photoconductor element according to the bit value of a record being read; and an electronic filter for applying an elemental frequency to said filament lamp; whereby the bit scanning kit produces an electrical signal at a reading frequency double that of the elemental frequency or no signal, according to the value of the bit being scanned.

3. A system according to claim 1 wherein said bit scanning kit consists of: a photoconductor; a continuous light beam source arranged to illumine said photoconductor according to the bit value of a record being read; a resonant reed relay having a reed armature; and a frequency multiple mask affixed to said armature and arranged to interrupt the light beam continuity according to its pattern.

References Cited in the file of this patent

UNITED STATES PATENTS

| | | |
|---|---|---|
| 2,143,875 | Hansell | Jan. 17, 1937 |
| 2,170,132 | Eitzen | Aug. 22, 1939 |